TAPE DRIVING APPARATUS

Filed Sept. 23, 1963 4 Sheets-Sheet 1

INVENTOR.
Charles V. Andersen
BY
Attorneys

INVENTOR.
Charles V. Anderson
BY [signature]
Attorneys

INVENTOR.

Charles V. Andersen

BY [signature]

Attorneys

INVENTOR.
Charles V. Andersen
BY
Flehr and Swain
Attorneys

United States Patent Office 3,221,963

Patented Dec. 7, 1965

3,221,963

TAPE DRIVING APPARATUS

Charles V. Andersen, Los Altos Hills, Calif., assignor, by mesne assignments, to Continental Capital Corporation and Sierra Capital Company, both of San Francisco, Calif., corporations of California Filed Sept. 23, 1963, Ser. No. 310,784

4 Claims. (Cl. 226—109)

This invention relates generally to a film or tape driving apparatus and more particularly to a capstan or drive means adapted to cooperate with an idler roller to drive a tape-like medium, such as motion picture film or magnetic tape. The invention is particularly adapted for use in magnetic tape recording and reproducing apparatus.

Apparatus where a film or tape is driven past a transducer often employs a driven capstan or drive means which cooperates with an idler roller to drive a film or tape at a constant speed past the transducer. In such apparatus and more particularly in high fidelity magnetic tape reproducing and recording apparatus, the tape or film speed must be kept relatively constant. For this purpose, the capstan or drive means is provided with a uniform cylindrical surface of predetermined diameter. The tape or film to be driven is pinched between the idler roller and the drive means to such an extent that slippage between the drive means and the tape or film is prevented. In certain instances, in the past, the surface of the capstan or drive means has been sand blasted to assure good frictional engagement and reduce slippage.

Where a plurality of tapes cooperate with a single elongated capstan or drive means, such as might occur in a stacked cartridge apparatus, there may be a tendency of the capstan to be deflected and thereby the pressure between the tape and drive means reduced whereby slippage may occur.

It is an object of the present invention to provide an improved capstan or drive means.

It is another object of the present invention to provide a capstan including a resilient portion which serves to provide good frictional engagement of the tape or film and a rigid portion which determines the diameter of the driving means.

It is another object of the present invention to provide a capstan formed of a rigid material having embedded therein over predetermined areas thereof resilient material which serves to engage and drive the tape.

The foregoing and other objects of the invention will become more clearly apparent from the following description when taken in conjunction with the accompanying drawings.

Referring to the drawing.

The apparatus illustrated includes a housing 11. The lower portion of the housing 11 houses the electronic components of the apparatus such as preamplifiers, amplifiers and control circuits. A control panel 12 accommodates the control switches and knobs.

Figure 1:
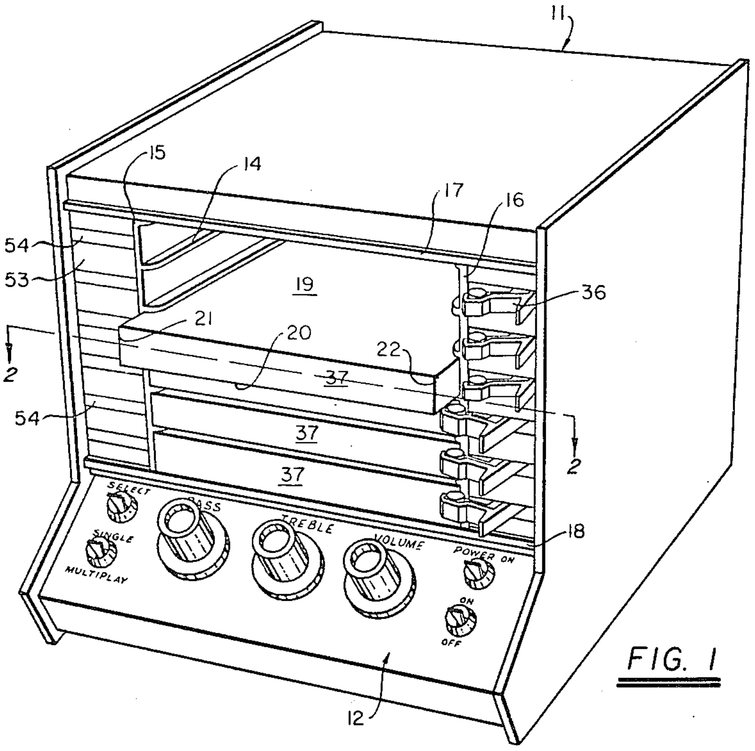
FIGURE 1 is a perspective view of apparatus in accordance with the invention.
Figures 3, 4, 5, 6:
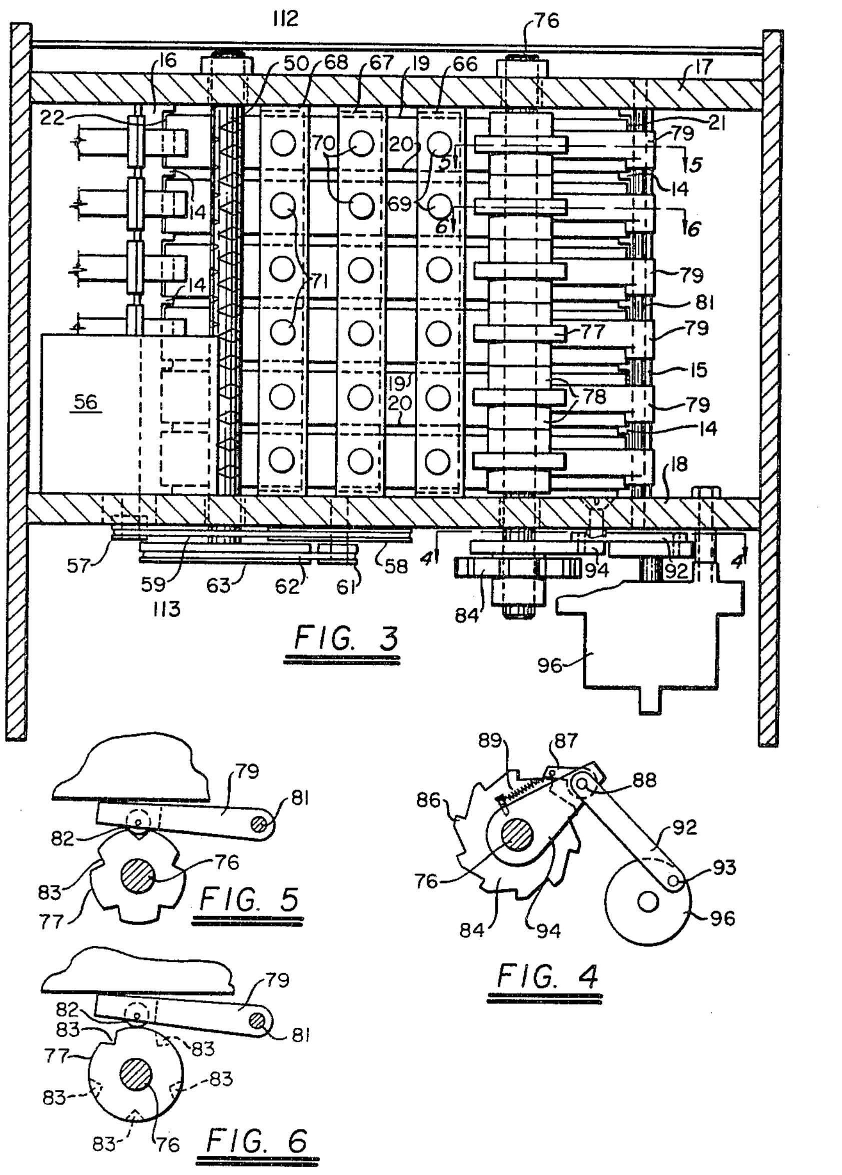
FIGURE 3 is a view taken along the line 3—3 of FIGURE 2.
FIGURE 4 is an enlarged view showing the cam advancing mechanism.
FIGURE 5 shows first programming cams viewed from the line 5—5 of FIGURE 3.
FIGURE 6 shows second programming cams as viewed from the line 6—6 of FIGURE 3.
Figure 7:
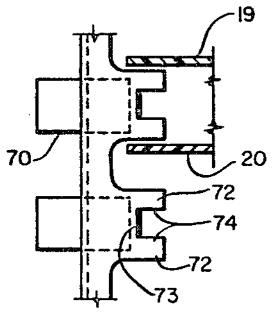
FIGURE 7 is a view taken along line 7—7 of FIGURE 2.

The upper part of the housing is adapted to receive tape magazines. Each of the magazines is guided by suitable guide means, for example, spaced guides 14 formed as ribs or spaced plates 15 and 16 which are mounted between spaced mounting plates 17 and 18 (FIGURES 1 and 3). Adjacent ribs or guides 14 engage the top and bottom 19 and 20 of the magazine at the side edges 21 and 22. The edges 21 and 22 of the magazine slide against the plates 15 and 16, respectively. The guide means orients the magazines for sliding movement into and out of the apparatus. The guides are so spaced and arranged that camming or other undesirable motion of the magazine is minimized.

The magazine may include a base plate 23 which includes a shaft 24 which rotatably receives a reel having a reel plate 26 and an upstanding hub 27. Endless magnetic tape is wound about the hub. The endless tape passes over a pinch roller 28, spaced guide rollers 29 and 31, and another guide roller 32. The tape, in general, is unwound from the center of the reel in conventional manner and is wound onto the outside of the reel. The magazines are releasably retained on the guides and urged toward the transducing means and tape drive means by latching means 36.

The latching means 36 has first and second operating positions. In the first operating position (upper latches, FIGURE 1), the latch is retained in its open position to allow insertion and removal of a magazine. When the latch is moved into this position, means are provided for ejecting or moving the magazine a short distance so that it can be easily grasped. In its second position (lower latches, FIGURE 1), the latch is disposed so as to engage the outer edge 37 of the magazine and to yieldably urge the same towards the rear of the apparatus into engagement with the tape drive means and transducing means, to be presently described.

Figure 2:
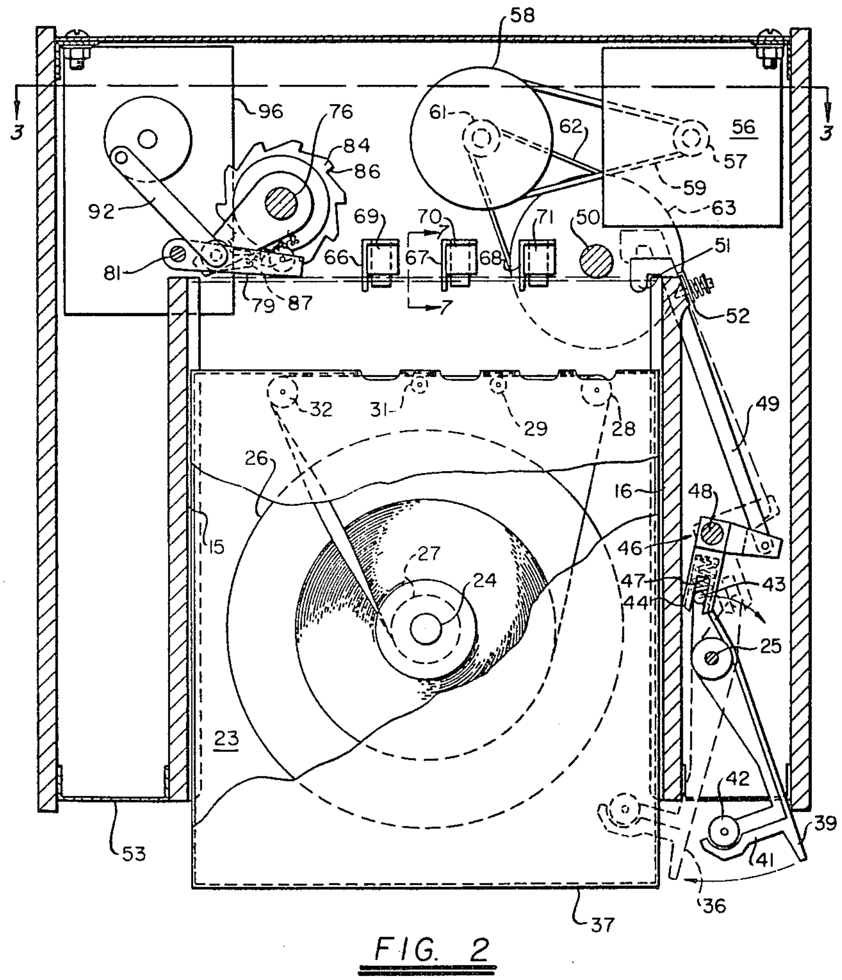
FIGURE 2 is a view taken along the line 2—2 of FIGURE 1.

The plurality of latches 36 are pivoted on a shaft 25, FIGURE 2. One end of the lever includes a tab or ear 39 which may be grasped or pushed with a finger for moving the latch between the first and second operating positions. Extending at substantially right angles to the body of the lever 36 is a finger 41 which carries a roller 42. The roller 42 in the second operating position of the latch (shown in dotted line) engages the end 37 of the magazine to urge the same into the apparatus.

The other end of the lever 36 is provided with ears 43 which ride in the spaced fingers 44 of the crank arm 46. A toggle spring 47 is retained between the four spaced fingers. As shown, the lever is toggled in a counterclockwise direction. Its motion is stopped by one of the fingers 44 abutting the adjacent plate 16. When the lever is in the position shown in dotted outline, the lever is toggled in a clockwise direction. The spring provides a force which resiliently urges the magazine toward the driving and transducing means.

The crank 46 is pivoted at 43, and the other end of the crank arm engages a rod-like member 49. Movement of the lever 36 results in substantially linear movement of the rod 49 as indicated by the two positions shown in dotted and solid line. It is observed that in the position shown in solid line (the first position of the latch 36), the lever is drawn so that the finger-like portion 51 strikes the magazine to drive the same out of the apparatus so that it can be easily grasped. In the second position of the latch 36, the member is drawn out of engagement. A spring-loaded guide 52 is provided for assuring that the end of the rod 49 moves in a substantially linear direction.

The latch assembly is carried in the space between the guide plate 16 and the side walls of the housing as illustrated in FIGURES 1 and 2. On the other side of the housing, the end of the space may be closed by U-shaped members 53 and 54 (FIGURE 2) which may be spaced to receive tags or other material identifying the content of the adjacent tape magazine.

Summarizing, in the first position of the latching means, the magazine is ejected and the latch toggled to its release position; in the second position, the latching means holds the magazine and resiliently, or yieldably, urges the magazine into engagement with the tape drive means and transducing means.

A capstan 50, to be presently described in detail, is rotatably mounted between the plates 17 and 18, FIGURES 2 and 3. The capstan 50 is adapted to cooperate with the pinch roller 28 of the individual magazines when the magazines are urged into their operating position.

The capstan may be suitably driven as, for example, by a motor 56 through belts and pulleys. Motor pulley 57 drives a first idler pulley 58 through a belt 59. A second idler pulley 61 carries belt 62 which drives the pulley 63 attached to the lower end of the capstan. To accommodate various tape speeds, the pulleys may be changed so that they have different ratios of diameters. Alternatively, the motor may be selected to provide a different speed.

One or more head mounting brackets are carried at the rear of the apparatus by the plates 17 and 18. In the illustrative example, three brackets 66, 67 and 68 are shown. Each of the brackets 66, 67 and 68 carries a plurality of magnetic heads 69, 70 and 71, respectively. The three magnetic heads may be recording, erase and playback heads 69, 70 and 71, respectively. If it is desired only to playback pre-recorded programs, then only one bracket is required with its associated heads one for each magazine. The bracket includes spaced fingers 72 forming a notch. The bottom 73 of the notch is adapted to abut the tape when the magazine is in the operative position. The sides 74 of the fingers 72 guide the tape.

The programming cam assembly includes a cam shaft 76 rotatably mounted between the spaced plate 17 and 18. The cam shaft is adapted to carry a plurality of cams. Each of the cams includes a cam surface 77 with hubs 78 on each side thereof. A plurality of cam follower levers 79, one for each cam, are rotatably carried on a shaft 81 which is disposed between the plates 17 and 18

The cam follower 79 carries a cam follower roller 82, FIGURES 5 and 6, which is adapted to ride on the cams. As is seen in FIGURES 5 and 6, each of the cams is provided with one or more notches. As the cams are rotated and the notch 83 falls adjacent one of the rollers, the lever 79 is allowed to rotate counter-clockwise as viewed in FIGURES 5 and 6. The magazine or cartridge may now move to the rear under urging of the toggle spring (FIGURE 2), in which position the capstan engages the tape between it and the pinch roller and serves to drive the same past the magnetic heads which are also in cooperative relationship with the tape carried in the magazine. The cam arrangement may be designed so as to eliminate the cam follower. The foregoing example is only illustrative of one manner of controlling the camming of the magazines.

As illustrated in FIGURE 5, the upper cam is provided with a plurality of notches, whereas the next cam is provided with a single notch as are each of the other cams. It is also observed that the notches in FIGURE 5 are angularly staggered with respect to the notches of FIGURE 6.

Assume the first selection on the first magazine is played. Rotation of the cam shaft 76 brings the notch 83 of one of the other cams adjacent its cam follower roller and allows that magazine to move to the rear with the tape engaging the capstan and transducer. The first magazine is urged forward out of engagement with the drive and transducer. Upon further rotation of shaft 76, magazine one will be moved to engage the drive and transducer. The magazine just completed will be cammed out of engagement. The notches may be arranged in any desired order to transduce the tape in the various magazines in the order desired. As illustrated in the drawings, the program will alternate between the first magazine and each of the second magazines in sequence. The sequence can be predetermined by appropriately notching the cams.

The cam shaft 76 is advanced by means of a ratchet wheel 84. The teeth 86 in the ratchet wheel are successively engaged by a pawl 87. The pawl 87 is pivoted on the shaft 88 and spring loaded with a spring 89. A rotary solenoid 96 rotates to advance and retract the link 92 to cause the pawl to engage each of the teeth successively to advance the ratchet wheel through one step for each energization of the solenoid. The link 92 is pivoted to the rotary solenoid at 93 and carried by arm 94 pivotally carried on the cam shaft 76. The number of teeth on the ratchet 84 is selected to correspond to the cam detent positions of the various cams so that at each step one of the notches 83 coincides with one of the cam follower rollers 82. Alternatively, the cam shaft 76 can be driven by a stepping motor (not shown).

Figure 8:
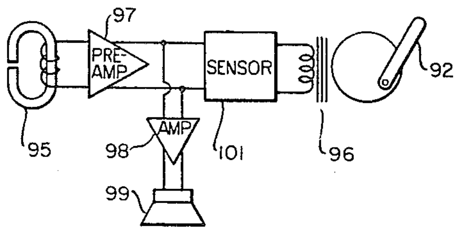
FIGURE 8 shows in schematic block diagram form a circuit used in conjunction with the transducer for advanciug the cams at the end of a recording.

A silent sensing circuit may be employed to energize the solenoid or motor at the end of each selection, be it a song, musical composition, teaching material or an instruction. A suitable electrical circuit is illustrated in FIGURE 8. A reproduce transducer 95 feeds a preamplifier 97. The output of preamplifier 97 is applied to a power amplifier 98 which drives a speaker 99.

The output of the preamplifier 97 may also be applied to a sensor 101 which serves to provide output signals for energizing the solenoid 96 to program the apparatus to the next selection. The sensor 101 may, for example, be a silent sensor which serves to provide an output pulse whenever a recording provides no output for a predetermined short period of time.

Assume, for example, that a plurality of instructions or information is recorded on the tape of the first magazine. If, during the recording of the instructions, a suitable silent interval is provided between each instruction, the silent sensor 101 will provide an output pulse which serves to energize the solenoid to rotate the cam shaft and program to the next magazine whenever the silent interval occurs during reproduction.

Upon the end of the selection in the new magazine, the appropriate silent period will occur and the cam shaft will be advanced another notch to bring the next notch adjacent the appropriate cam follower for programming to the next magazine.

Figure 9:
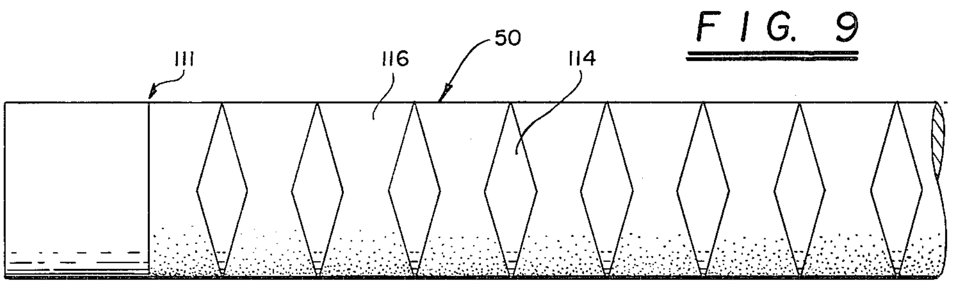
FIGURE 9 shows a side elevational view of a capstan in accordance with the invention.
Figure 10:
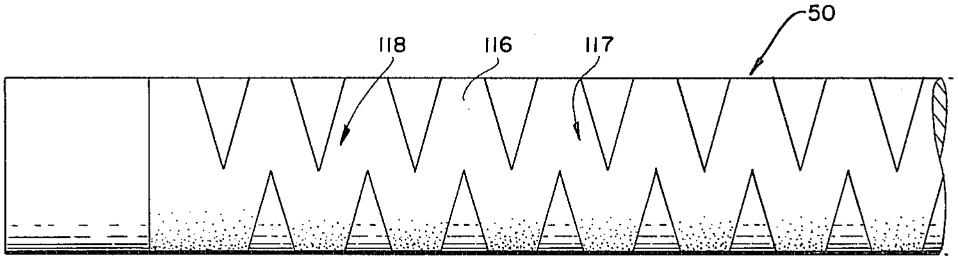
FIGURE 10 shows an elevational view of the capstan of FIGURE 9 rotated 90°.

Referring more particularly to FIGURES 9 and 10, there is shown a drive means or capstan 50 in accordance with the present invention. The capstan is in the form of a shaft 111 having smooth end portions which are journalled in the spaced bearings 112 and 113, FIGURE 3. The lower portion of the shaft receives the drive pulley 63 previously described.

The shaft has a cylindrical outer surface of predetermined diameter whereby a tape engaged by the surface is driven a predetermined distance for each revolution of the shaft. Preferably, the shaft is hardened whereby to minimize wear to maintain a relatively constant diameter.

The shaft is grooved to define lands or ridges 114 having as a common surface the original cylindrical surface of the shaft. The grooves are filled with a resilient material 116, such as rubber. The outer surface of the material is substantially coextensive with the cylindrical surface just described.

In operation, the resilient material engages and drives the tape and may even be slightly compressed. However, the lands which define the fixed diameter cylindrical surface contact the tape and serve to provide the surface the accurate diameter required to drive the tape. The resilient material provides good frictional driving engagement and also may accommodate itself for slight flexure of the shaft. The material 116 may be made to extend slightly above the cylindrical surface just described to provide good engagement while requiring small pinching pressures.

In one particular example, a drive capstan was formed from stainless steel having an outer diameter of .3120 inch. The shaft was then threaded by forming Acme threads at six threads per inch, both left and right hand 117 and 118 respectively, to give a configuration such as that shown in the drawings. The shaft was then heat treated to provide hardness.

The bottom of the grooves were sand blasted for better adhesion and then filled with rubber. The rubber was then machined so that its surface coincided with the cylindrical surface including the lands 114.

It is, of course, apparent that other types of materials may be used for the capstan and for the resilient material. It is important, however, that the resilient material be such as to have good wearing characteristics and sufficient resiliency whereby to bring into contact with the tape or film being driven the hard cylindrical surface of the lands or ridges 114.

Although the preferred embodiment is where the plurality of lands are in the form of separated islands defined by the oppositely directed grooves, it is possible to form a capstan with a number of parallel circular grooves, or with one or more helical grooves. It is, of course, apparent that the same considerations can be applied to a captan which is intended to engage a single tape rather than a plurality of tapes.

I claim:

1. Apparatus of the character described including transducing means, means for supporting a tape-like medium for movement past said transducing means, an idler roller for cooperation with said tape-like medium and a capstan arranged to engage said tape-like medium whereby the medium is pinched between the idler roller and the capstan to be driven by the capstan, said capstan comprising a cylindrical member grooved to define lands arranged so that any section taken perpendicular to the axis of the cylinder will intercept both lands and resilient material in equal amounts, the surface of said land coinciding with the surface of said cylindrical member, and resilient means filling said groove and having a cylindrical outer surface substantially coincident with said surface.

2. Apparatus as in claim 1 wherein said member is grooved by left and right-hand directed helical grooves to form a plurality of lands.

3. Apparatus of the character described including transducing means, means for supporting a plurality of tape-like mediums for movement past said transducing means, means including a capstan for driving said tape-like mediums, said capstan being in the form of an elongated cylindrical member adapted to have portions arranged to engage each of said plurality of tape-like mediums, said cylindrical member being grooved to define lands arranged so that any section taken perpendicular to the axis of said elongated cylinder will intercept both lands and resilient material in equal amounts, the surface of said land coinciding with the surface of said cylindrical member, and resilient means filling said grooves and having a cylindrical outer surface substantially coincident with said surface.

4. Apparatus as in claim 3 wherein said member is grooved by left and right-hand directed helical grooves to form a plurality of lands.

References Cited by the Examiner

UNITED STATES PATENTS

| | | | |
|---|---|---|---|
| 1,955,713 | 4/1934 | Tomlin | 226—161 |
| 2,308,862 | 1/1943 | Crafts | 226—191 X |
| 3,077,293 | 2/1963 | Watkins | 226—191 X |
| 3,122,294 | 2/1964 | Laa | 226—190 X |
| 3,126,162 | 3/1964 | MacKenzie | 226—110 X |

ROBERT B. REEVES, *Primary Examiner.*